2 Sheets—Sheet 1.

P. J. TORNEY.

Marble Sawing Machine.

No. 3,931. Reissued April 19, 1870.

WITNESSES:

Henry Hing

Leopold Eberle

INVENTOR.

P. J. Torney per Alexander Hamilton

Atty.

N. PETERS, Photo-Lithographer, Washington, D. C.

2 Sheets—Sheet 2.

P. J. TORNEY.

Marble Sawing Machine.

No. 3,931. Reissued April 19, 1870.

WITNESSES.

Harry King

C. L. Ewert

INVENTOR.

per P. J. Torney

Alexander F. Mackie, atty.

N. PETERS, Photo-Lithographer, Washington, D. C.

United States Patent Office.

P. J. TORNEY, FOR HIMSELF AND CHARLES W. HAYDEN AND JOHN L. KIDWELL, ASSIGNEES OF P. J. TORNEY OF WASHINGTON, DISTRICT OF COLUMBIA.

*Letters Patent No.* 84,518, *dated December* 1, 1868; *reissue No.* 3,931, *dated April* 19, 1870.

IMPROVED MACHINE FOR SAWING MARBLE.

The Schedule referred to in these Letters Patent and making part of the same

*To all whom it may concern:*

Be it known that, P. J. TORNEY, of Washington, in the District of Columbia, invented certain new and useful Improvements in Machines for Sawing Marble; and we do hereby declare that the following is a full, clear, and exact description thereof, reference being had to the accompanying drawings, and to the letters of reference marked thereon.

The nature of this invention consists in the construction and general arrangement of a machine for sawing marble, as will be hereinafter more fully set forth.

In order to enable otLers skilled in the art to which this invention appertains to make and use the same, we will now proceed to describe its construction and operation, referring to the annexed drawings, which form a part of this specification, and in which—

A represents a frame, of suitable dimensions, in the upper part of which two shafts, *a a*, have their bearings.

These shafts are placed across the frame, one near each end, and are at one end, outside of the frame, provided with a worm-wheel. B.

The worm-wheels B B and shafts *a a* are turned by worm screw-threads, on a shaft, C, which is placed in suitable bearings on the outside of the frame A.

Figure 1:
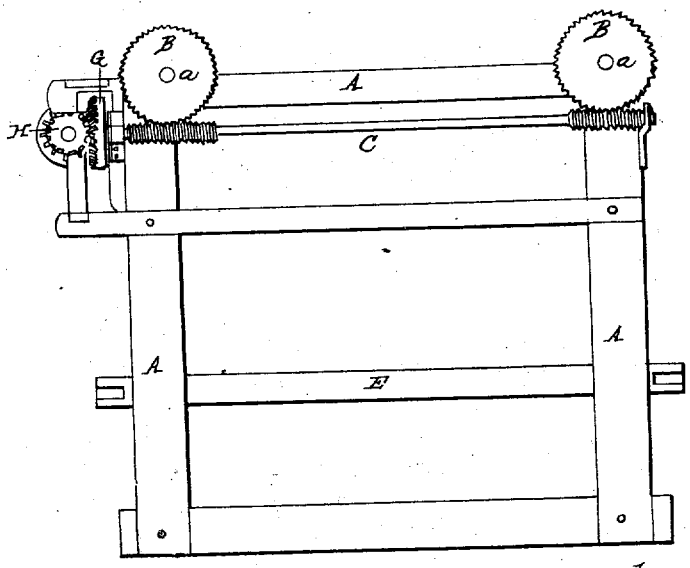
Figure 1 is a side elevation of my machine.
Figure 2:
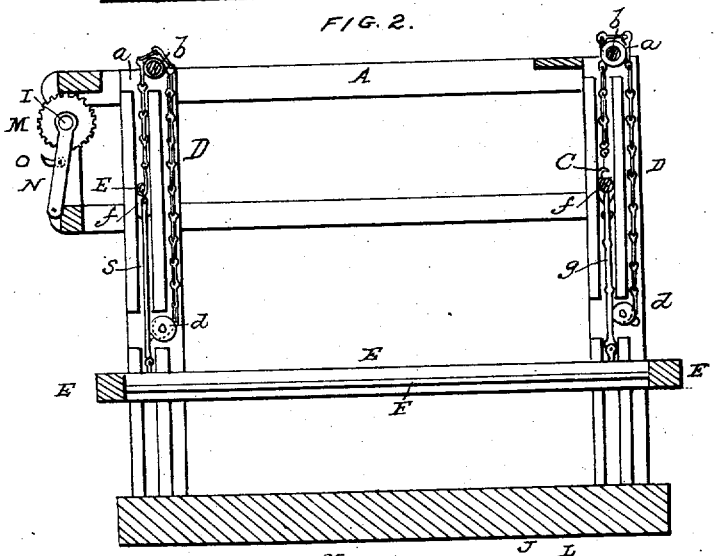
Figure 2 is a longitudinal vertical section of the same.
Figure 3:
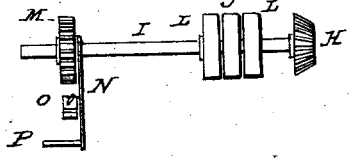
Figure 3 is a view of the running gear.
Figure 4:
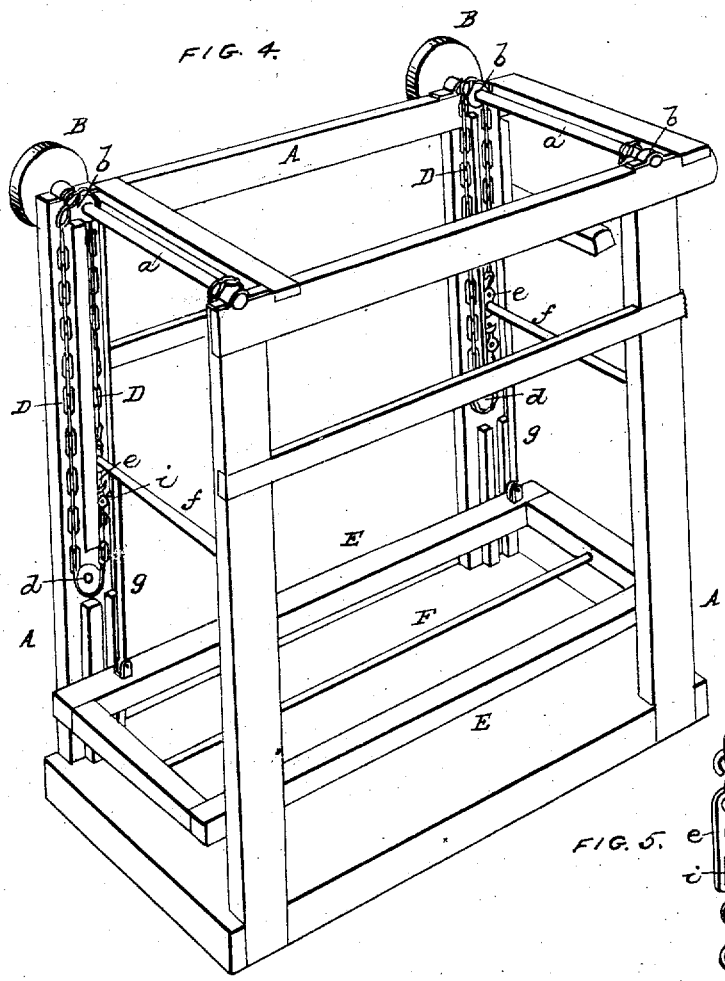
Figure 4 is a perspective view of the machine.
Figure 5:
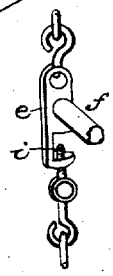
Figure 5 is an enlarged perspective view of a clamp used in the machine.

The shafts *a a* are provided with pulleys *b b* placed at or near each end of the shafts, and directly over the corner posts of the frame A, which posts are grooved a suitable height with two straight grooves, as shown in fig. 2. The pulleys *b b* are square, having any number of sides desired, an odd number being preferable.

Over the pulleys *b b* are placed endless chains D D, which chains run in the grooves mentioned on the corner posts of the frame A, and at the lower ends of said grooves the chains D D are placed around other pulleys *d d*, which may be round or square, as may be desired, and attached to the posts of the frame.

The chains D D may be tightened around the pulleys *b* and *d* by the clamp *e* and screw *i*, as shown in fig. 2.

The four clamps *e e*, two at each end of the frame, are connected by rock-shafts *f f*, the ends of which have their bearings in said clamps.

From the rock-shafts *f f* four arms, *g g*, descend, said arms being, at their lower ends, hinged or pivoted to a saw-frame, E, which frame is thus swung from the endless chains D D, and can be moved back and forth by a pitman, connecting it with any engine desired to be used.

A saw, F, or several of them, may be arranged in any suitable manner in the frame E.

It will readily be seen that, by turning the shaft C in one direction, the endless chains D D will be turned on their pulleys, thus raising the saw-frame E up, and if the shaft C is turned in the opposite direction, the frame will be lowered.

To accomplish this, the end of the shaft C is provided with a pinion, G, which gears into another pinion, H, on the end of a small shaft, I, which is placed in suitable bearings on the end of the frame A.

This shaft I is provided with one stationary pulley J, and two loose pulleys L L, placed one on each side of the stationary one.

If, now, a straight belt is placed over one of the pulleys L, and a turned belt over the other, both being connected with the engine, it will readily be seen that it is only necessary to change either one of these belts to the stationary pulley J to obtain whichever motion to the saw-frame E is desired, either up or down.

When the machine is in operation, it is always desired to feed the saw or saws gradually downward. For this purpose the shaft I is provided with a cog-wheel, M, and at the side thereof, on the shaft, is a movable arm, N.

This arm is provided with a pivoted dog or pawl, O, which catches into the cogs on the wheel M.

The arm N, at its outer end, is also provided with a pin, T, from which a pitman connects it with the countershaft on the engine in such a manner that, for each revolution, the dog O will move down around the wheel a certain distance, catch on one of the cogs and turn it around, at the same time turning the shaft C, and, consequently, lower the saw-frame E.

The object of using endless chains for suspending the saw-frame is to prevent the frame from jumping up when moving fast.

In all other machines of this kind it is impossible to run with very great speed, as the chains suspending the frame are not held at their lower end, and, consequently, the saw-frame will jump up as it moves backward and forward.

This is obviated by using the endless chains, as these chains are held firmly below as well as above by the pulleys, and, consequently, they cannot give.

A machine of this kind can be run with any speed desired.

Having thus fully described the invention,

What we claim as new, and desire to secure by Letters Patent, is—

1. The shafts *a a* with worm-wheels B B and pulleys *b b*, in combination with the endless chains D D and pulleys *d d*, all constructed and arranged substantially as herein set forth.

2. In a marble-sawing machine, the rock-shafts *f f* and connecting rods *g g g g*, when constructed as described, to allow the saw-frame E to reciprocate, all substantially as set forth.

3. The arrangement of the shaft I with pulleys J and L L and pinion H, operating in combination with the pinion G and worm screw-threads on the shaft C to raise or lower the saw-frame, substantially as herein set forth.

4. The combination of the shaft I, cog-wheel M, and arm N, the latter provided with a dog or pawl, O, and connected in a suitable manner with an engine, for the purpose of feeding the saw while the machine is in operation, substantially as herein set forth.

In testimony that we claim the foregoing we have hereunto set our hands and seals this 16th day of March, 1870.

P. J. TORNEY. [L. S.]
C. W. HAYDEN. [L. S.]
JNO. L. KIDWELL. [L. S.]

Witnesses:
N. CALLAN,
N. CALLAN, Jr.